United States Patent [19]

Dinh-Tuan Ngo

[11] 3,851,327

[45] Nov. 26, 1974

[54] LIGHT PEN DETECTION FOR PLASMA DISPLAY SYSTEM USING SPECIALLY-TIMED ERASE PULSE

[75] Inventor: Peter Dinh-Tuan Ngo, Colts Neck, N.J.

[73] Assignee: Bell Telephone Laboratories, Incorporated, Murray Hill, N.J.

[22] Filed: Mar. 29, 1973

[21] Appl. No.: 345,893

[52] U.S. Cl.. 340/324 M, 340/173 PL, 315/169 TV

[51] Int. Cl. .......................................... H05b 41/34

[58] Field of Search ........... 340/324 R, 324 M, 336, 340/173 PL; 315/169 R, 169 TV

[56] References Cited

UNITED STATES PATENTS

| | | | |
|---|---|---|---|
| 3,573,542 | 4/1971 | Mayer et al. | 315/169 R |
| 3,614,739 | 10/1971 | Johnson | 315/169 TV |
| 3,618,071 | 11/1971 | Johnson et al. | 340/324 M |
| 3,651,509 | 3/1972 | Ngo | 315/169 TV |

*Primary Examiner*—John W. Caldwell
*Assistant Examiner*—Marshall M. Curtis
*Attorney, Agent, or Firm*—W. Ryan

[57] ABSTRACT

A light pen capability is added to prior art plasma display panels by providing an erase pulse of standard design in a scanning manner over the array, the pulse being positioned relative to the normal sustain pulse sequence in such manner that a light pulse is emitted upon the erase which is detected by a light pen of standard design while permitting the discharge of the wall capacitance to not proceed beyond the point at which it would cause extinction of the discharge.

15 Claims, 9 Drawing Figures

LIGHT PEN DETECTION FOR PLASMA DISPLAY SYSTEM USING SPECIALLY-TIMED ERASE PULSE

BACKGROUND OF THE INVENTION

1. Field of the Invention

The present invention relates to display systems for use in cooperation with a computer or similar control system. The present invention further relates to means for adding a light pen capability to an existing display system under the control of a computer or similar control system.

2. Description of the Prior Art

Plasma display systems which rely on light emitted from an array of individual plasma discharge cells are now well known in the art. For example, U.S. Pat. No. 3,559,190 issued Jan. 26, 1971 to Bitzer et al. describes an early development in the field. In some respects plasma display panels are similar to well known cathode ray display systems such as those described in U.S. Pat. No. 3,653,001 issued Mar. 28, 1972 to W. H. Ninke and U.S. Pat. No. 3,389,404 issued June 18, 1968 to R. A. Koster. An important difference, however, between plasma display systems and CRT-based systems is that plasma displays have inherent memory, i.e., they need not be constantly refreshed by an information bearing sequence corresponding to the desired visual image. Thus, once a pattern of "on" and "off" cells is established, plasma display systems require only that there be applied to each "on" cell on a periodic basis a sustain signal to renew the discharge at operating cells or crosspoints. This sustain signal is not itself sufficient to cause breakdown. However, when breakdown has previously existed such pulses will cause the discharge to be maintained.

A useful adjunct of any computer-based display system is a so-called light pen for communicating to a computer or other control mechanism a location on the display surface. In typical CRT display systems, such as systems described in the Ninke and Koster patents, supra, a light pen is sensitive to the application of signals by the computer or similar device to the CRT. The computer then correlates the detection of the resulting light pulse and information stored internally relating to the refresh data causing the light to be emitted.

Because reference to te picture information is not always immediately available to the control computer for purposes of correlation as in CRT systems (because the information need not be available for refresh purposes), plasma display systems have used a slightly different arrangement. In general, a separate scanned pulse is used to generate a corresponding identifiable light pulse which can be detected by the light pen. For example, in accordance with my earlier invention described in U.S. Pat. No. 3,651,509 issued Mar. 21, 1972 I provide a system for effectively combining a light pen with a plasma display system. It will be noted, however, that the system described in this earlier patent requires the addition of a moderate amount of special purpose circuitry. Further, for some applications operating margins are found to be less than optimum.

R. L. Johnson, in his PhD thesis submitted to the University of Illinois and issued in University of Illinois *Coordinated Science Laboratory Report R-461* entitled "The Application of the Plasma Display Technique to Computer Memory Systems," April 1970, indicates an additional technique for generating a light output in response to interrogation signals which may be detected using well known light detecting techniques. The work of Johnson, however, was not specifically oriented to use with a light pen, and, as reported, was not successful in uniquely identifying single discharges.

SUMMARY OF THE INVENTION

Briefly, the present invention, in typical embodiment, provides means for using existing capabilities found in prior art plasma display systems to generate a scanning pulse suitable for detection by a light pen operating under control of standard addressing circuitry. In one embodiment, the erase pulse typically used in plasma display systems in erasing a glow discharge, (i.e., changing a 1 to 0), is selectively delayed in such manner that the wall discharge usually accompanying the application of an erase pulse is not permitted to go to completion. Rather, the normally succeeding sustain pulses are used to restore the selected cell to the "on" (1) condition. The process of applying the delayed erase pulse followed in short order by the normal sustain pulse sequence is such as to produce a light pulse at other than the normal sustain pulse time. This "unusual" light pulse only occurs at the selected cell; the other non-selected cells and, of course, the "off" cells produce no such output. The position on the display surface of the selected cell is readily identified by placing a standard light pen in juxtaposition with a discharge cell and recognizing the "unusual" emitted light pulse when the scanning pulse is applied to the selected cell.

DETAILED DESCRIPTION

Basic Device Characteristics

Before discussing the improvements resulting from the present invention, it is considered advisable to briefly review typical prior art plasma display systems. The above-cited Bitzer et al. patent, and the paper by Johnson and Schmersal, "A Quarter-Million-Element AC Plasma Display With Memory," *Proceedings of the Society for Information Display*, Vol. 13, No. 1, First Quarter 1972 (and other articles in that issue) provide a useful summary of such systems.

Structurally, plasma display panels are rectangular arrays of gas discharge cells, which cells are separated from orthogonal exciting electrodes by layers of dielectric material. In the most basic application of the device, i.e., a two-level digital display, the entire array of elements is excited by one alternating (or bipolar pulse) signal which, by itself is of insufficient magnitude to ignite gas discharges in any of the elements. If, however, the walls of an element are appropriately charged, as a result of a previous discharge, the voltage across the element will be augmented, and a new discharge can be ignited. Electrons and ions again flow to the dielectric walls extinguishing the discharge and establishing a reverse field. On the following half cycle the field thus established again augments the external (now opposite polarity) voltage and makes possible another discharge in the opposite direction. In this way a sequence of electrical discharges, once started, can be sustained by an alternating voltage signal, that, by itself, could not initiate the sequence.

Typically, elements of a plasma array in the "0" or "OFF" state are characterized by the absence of a discharge sequence and therefore the absence of light output from those elements. Elements in the "1" or "ON" state are characterized by pulse discharges and associated light pulses occuring once each half cycle of the exciting voltage. The stability characteristics and nonlinear switching properties of these bistable elements are such that the state of any element in the array can be changed by selective application of coincident address voltages to the appropriate electrodes. The address voltages, by controlling discharge intensity, accomplish selective state changes by perturbing only the wall voltage of the element being addressed.

Figure 1A:
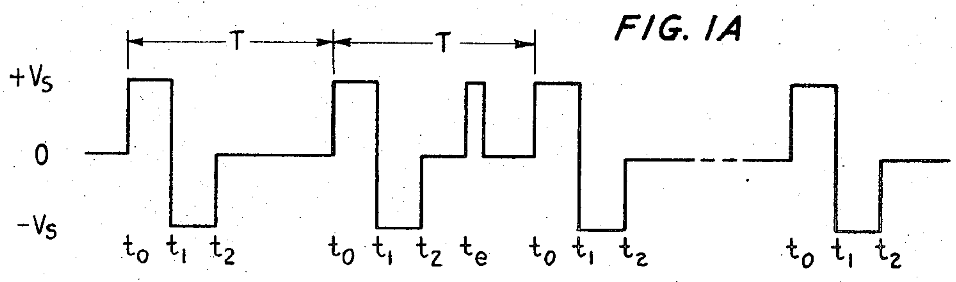
FIGS. 1A–C show applied signals and resulting cell voltage and light outputs formed in prior art plasma panel display systems.
Figure 1B:
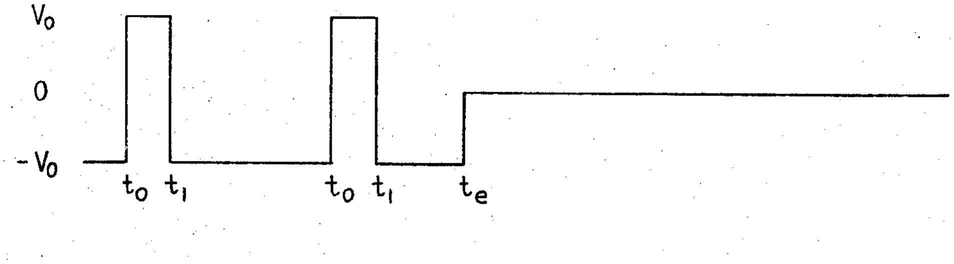
Figure 1C:
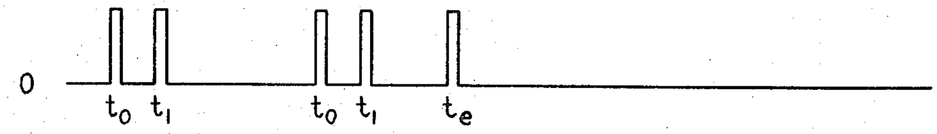

FIGS. 1A-C illustrate the typical applied waveforms and resulting light signals occurring during a normal sustained operation for "on" cells in prior art plasma display panels. Because prior art use of plasma panels and use in accordance with the present invention both are based on a periodic T-second "sustain cycle," all times will be referenced to this cycle.

In FIG. 1A a portion of the periodic bipolar sustain signal is shown; each of the bipolar portions of the sustain signal shown in FIG. 1A has a magnitude of $V_S$. The first portion of the T-second sustain cycle, beginning at time $t_0$ and extending to $t_1$, has a positive level of $V_S$. Similarly, during the portion of the cycle extending from $t_1$ to $t_2$, a negative pulse of magnitude $V_S$ is shown. These pulses are typically repeated at a sufficiently rapid rate so that, when combined with the previously accumulated cell charge, an apparently continuous discharge of the "on" cells is achieved. If the discharges occur at a sufficiently rapid rate, the cell charge is not permitted to become depleted, i.e., the cell memory stores the visual information. FIG. 1B shows a typical representation of the cell charge resulting from the application of sustain signals of the form shown in FIG. 1A to an "on" cell in a plasma display panel. The actual voltage levels will not usually be constant in each of the intervals $(t_0, t_1)$ and $(t_1, t_0)$. The important point is that they retain a sufficiently high absolute level that they combine effectively with the following sustain pulse to cause a renewed discharge.

FIG. 1C shows the resulting light pulses occurring when an "on" cell is sustained by the application of pulses of the type shown at the left of FIG. 1A. In particular, it should be noted that during each sustain cycle distinct light pulses are emitted at times when the discharge occurs and the cell charge is reversed, as shown in FIG. 1B. It should be borne in mind, however, that although the wall or cell charge accumulated as a result of the application of the sustained signals in FIG. 1A is shown as being accomplished in essentially zero time, a finite, but small, time is actually required for this function to be accomplished. The light pulses shown in FIG. 1C, which accompany the discharge resulting from the application of the sustain signals in FIG. 1A continue until the charge accumulation shown in FIG. 1B reaches a level which causes the discharge to be terminated. However, these time intervals are sufficiently short that the sustain signal transition, the resulting charge reversal and the light pulses may be shown in FIGS. 1A–C as occurring contemporaneously.

Also shown in FIG. 1A is an erase pulse occurring at time $t_e$ in the second T-second sustain cycle. As is well known in the plasma display arts, the erase pulse beginning at time $t_e$ is of a magnitude sufficient to cooperate with the previously accumulated cell charge to cause a new discharge to begin. However, because the duration of the erase pulse is very short relative to the normal sustain pulses, there is insufficient charge supplied to the discharging cell to permit the reestablishment of charge of opposite polarity. Rather, the effect of the erase pulse is to merely cause the previously accumulated cell charge to be dissipated in producing the discharge and to result in zero net charge on the cell walls. This effect on the cell charge is shown in FIG. 1B. From the time, $t_e$, that an erase pulse is applied as shown in FIG. 1A, the cell charge for a previously "on" cell remains at zero until it is rewritten by another "write" pulse in standard fashion. FIG. 1C indicates that a light pulse accompanies the discharge associated with the erase function.

FIG. 1B shows that after $t_e$ no net charge is stored in the cell, and no light pulses are generated as a result of the application of subsequent sustain signals. That is consistent with the well-known fact that the sustain signals are not themselves sufficient to cause a discharge to occur. Once a cell is established in the "off" condition, the sustain signals will not cause it to assume the "on" condition.

Desirable Characteristics for a Light Pen Detection System

As noted above, use of light pen identification techniques is quite commonplace in CRT display systems. CRT systems, however, rely on a raster scan, or in any event the sequential point-to-point, generation of images. Plasma display systems, on the other hand, introduce a potential ambiguity by providing for the substantially concurrent refreshing (sustaining) of a large number or all of the "on" cells. Thus, one cannot rely on the simple occurrence of a light pulse at a point on a displayed image.

With this last cautionary note and the basic operation of a plasma panel in mind, it will be appreciated that the following represent desirable operating characteristics for a light pen detection system.

1. Some means for establishing a relationship between the time of detection of light pulses and position of a light pen on the panel is required. The obvious choice, and the one described in my prior invention described in U.S. Pat. No. 3,651,509, is to generate a scanning pulse which appears in a prescribed predictable order at every cell.

2. For the light pen to discriminate a light pulse generated by a scanning pulse from other light pulses caused by the normal sustain voltages, the scan-generated light pulses must occur at a time other than the time at which the normal light pulses resulting from sustain pulses occur. That, is, the scan-generated light pulses must occur at other than $t_0$ or $t_1$, in FIGS. 1A–C.

3. The scanning pulse should cause only the selected "on" cell to flash. Other "on" cells must not be disturbed.

4. The scanning must not alter the state of "on" cells being scanned. After producing the signaling flash, the cell has to be maintained in its original "on" state.

5. The scanning must not disturb the state of "off" cells or cause them to flash.

6. The scanning time should be small to permit rapid identification of a cell.

Modification to the Erase Pulse Generation

Figure 1D:
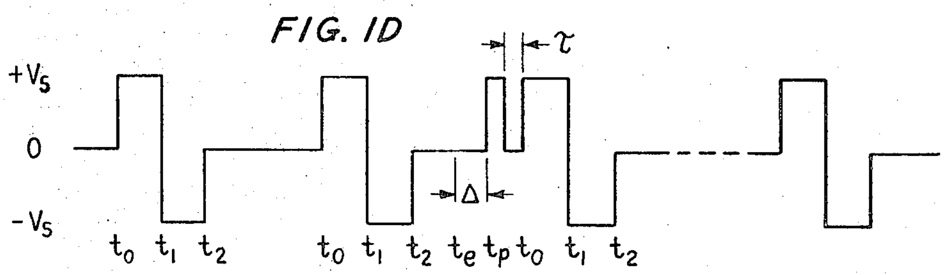
FIGS. 1D–F show modified waveforms associated with a plasma display panel in accordance with one embodiment of the present invention.
Figure 1E:
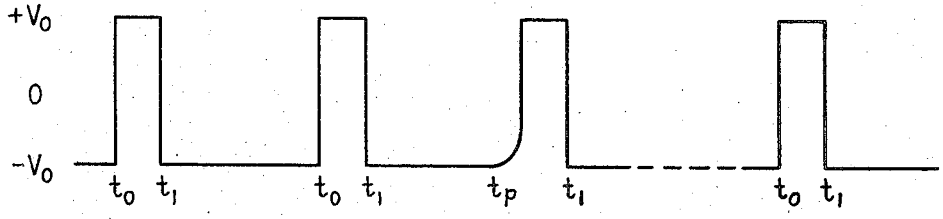
Figure 1F:
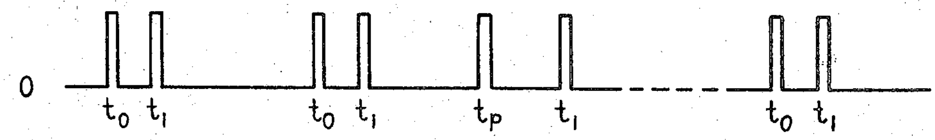

FIGS. 1D–F show modifications made to the normal erase pulse generation process to facilitate use of a light pen with the plasma display. In particular, FIG. 1D shows how a delayed erase pulse may be used to generate a light pulse at an "on" cell at other than the normal erase pulse interval. A delayed erase pulse is advantageously initiated beginning at $t_p$, the time $\tau$ is chosen to be small as compared with the normal spacing between an erase pulse and the end of a sustain cycle, i.e., $\tau = T - t_p << T - t_e$, where time is measured from the start of a sustain cycle. Typical values for $\tau$ will be given below.

The effect of the delayed erase pulse is twofold: a light pulse is generated at $t_p$ as shown in FIG. 1F, and a discharge of the cell capacitance begins. Since the light pulse occurring at $t_p$ is at other than the standard time associated with normal sustain or erase operation, it may be used to identify the particular "on" cell to which the delayed erase pulse is applied. Further, since the discharge of the cell capacitance starts at a time close to the following sustain pulse, the voltage associated with this charge will not have decreased to such a point that the sustain voltage fails to reignite the discharge. Thus, the cell capacitance continues to charge toward the $+V_0$ level after the application of the delayed erase pulse as shown in FIG. 1E, rather than to go to zero after the normal erase pulse as shown in FIG. 1B. When the next normal sustain transition occurs at $t_1$, the normal light pulse is emitted; the cell has remained "on".

It will be noted that the other desirable characteristics listed above are readily achieved by scanning the delayed erase pulse over the panel at the rate of one cell per sustain cycle. All that is required is means for applying a delayed erase pulse in a scanning manner to the plasma panel, and means for detecting the resulting light pulse.

Figure 2:
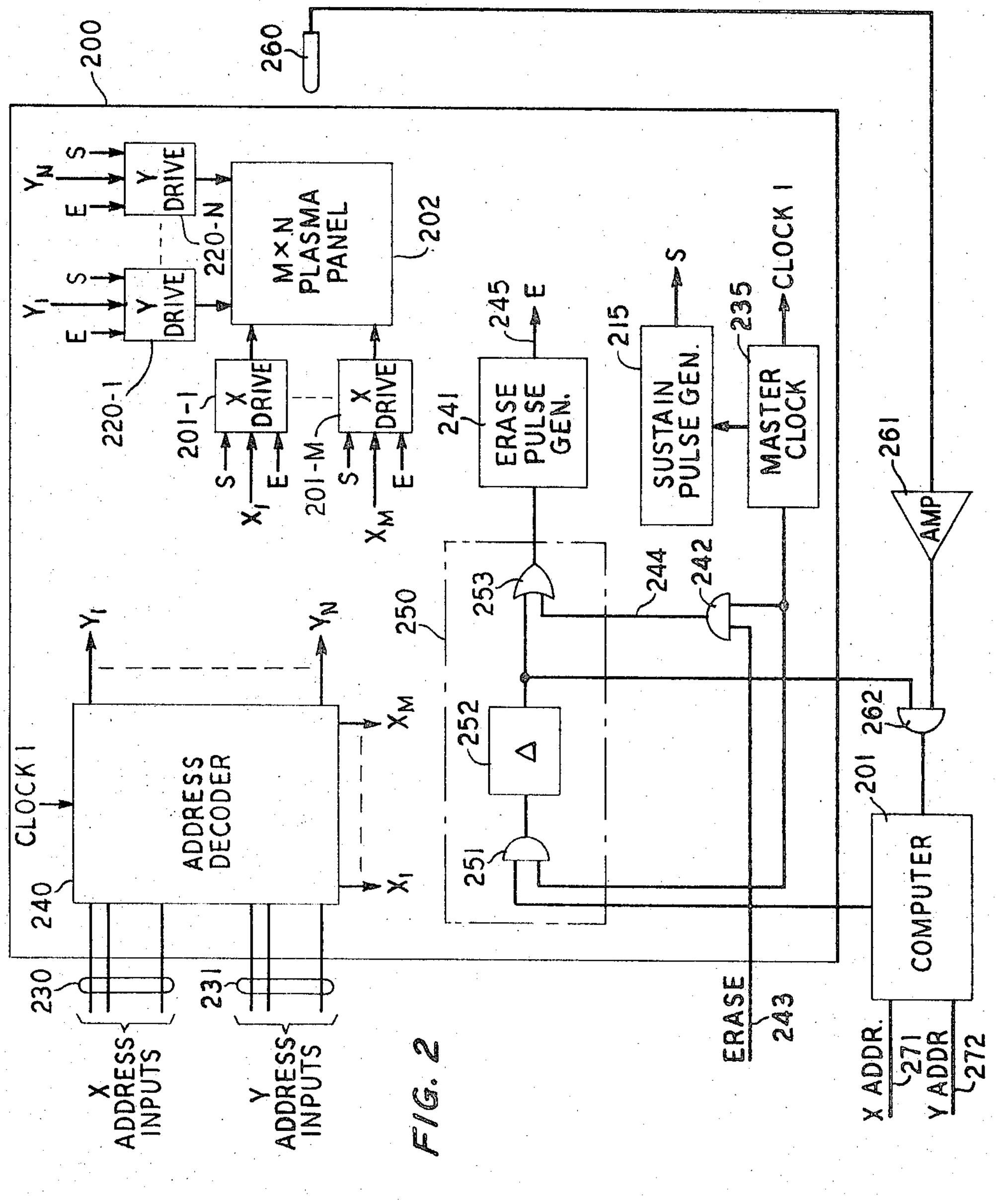
FIG. 2 shows circuit modifications made to prior art plasma display systems in accordance with one embodiment of the present invention.

FIG. 2 shows the actual circuitry for accomplishing the functions associated with the waveforms shown in FIGS. 1A–F and described above. A plasma display panel 200 is shown which (excepting the portion contained in dashed lines 250) represents a standard plasma display system of the type described in the Bitzer et al patent and the Johnson and Schmersal paper, supra. An M by N plasma display panel 202 is seen to have connected to it individual drivers associated with the respective rows and columns of the matrix display. Since the panel is assumed to be of dimensions M by N, there are M row drivers 210-*i*, $i = 1,2, \ldots, M$. Similarly, there are N column drivers 220-*i*, $i = 1,2, \ldots, N$. Each of the row and column drivers is arranged to provide pulses of appropriate magnitude for coincidently accomplishing the sustain function. These drivers are also adapted, in now standard fashion, to superimpose on or modify the sustain pulses to erase a "1" previously stored in a selected cell. Since the write function is not crucial to an understanding of the present invention, (all picture information will be assumed to be previously stored in the panel cells) all references to the write function are eliminated for simplicity in the circuit shown in FIG. 2. It will be understood, however, that write circuits of the type found in the prior art will be used under the control of clock and addressing circuits to generate images on plasma panel 202 in standard fashion. Individual row and column drivers shown in FIG. 2 are addressed in standard fashion by a select signal indicated by the input $X_i$, $i =,1,2, \ldots, M$, and $Y_i$, $i = 1,2 \ldots$ r,N, as appropriate.

The address inputs to the respective X and Y drivers 210-*i* and 220-*i* are, in turn, generated (at a rate of one per sustain cycle) by an address decoder shown as 240 in FIG. 2. The addresses to be decoded are supplied on a plurality of X and Y address inputs shown as 230 and 231, respectively, in FIG. 2. The address selection, of course, is presently relevant only to the generation of erase pulses for erasing a "1" condition appearing at the designated address on the plasma panel. In particular, the occurrence of a signal on a pair of $X_i$ and $Y_i$ leads and a signal on the associated E lead causes the delivery of the erase pulse to the appropriate cell.

The erase pulse appearing on the various E lead inputs of the row and column driver is, in turn, generated by erase pulse generator 241. The erase pulse generator 241 receives an input signal on lead 243 designated simply as the "erase" lead. The signal on lead 243 is assumed to extend for the duration of an entire sustain cycle, i.e., a duration of T seconds as shown in FIG. 1A. The signal on lead 243 then is ANDed with an appropriate clock signal occurring at $t_e$ which is generated by master clock 235. The effect of ANDing the signal on 243 with such a signal from master clock 235 is to supply a pulse on lead 244 beginning at time $t_e$ during a sustain cycle. Normally this pulse would pass by way of the 244 to erase pulse generator 241, thereby generating on lead 245 the E (erase) pulse.

In accordance with the present invention, however, an OR circuit 253 is interposed between AND gate 242 and erase pulse generator 241. OR circuit 253 supplies an alternate path for activating erase pulse generator 241. The other input to OR circuit 253, in accordance with the present invention, derives from a combination of AND gate 251 and delay circuit 252. As was the case with AND gate 242, AND gate 251 provides an ANDing of the usual erase clock pulse from master clock 235 with a gating signal. In accordance with typical modifications introduced with the present invention, however, the gating signal applied to gate 251 is derived from an input source, assuming the typical form of an external computer as shown in FIG. 2. In operation, then, a pulse derived from computer 201 is applied to AND gate 251 in combination with the normally occurring clock pulse from master clock 235. The output from AND gate 251 is, however, delayed by delay circuit 252 before application to OR circuit 253. The overall effect of the operation of the circuit shown in FIG. 2, as modified in accordance with the present invention, is to provide erase pulses occurring at either the normal or a selectively delayed portion of the sustain cycle. As indicated above, such an appropriately delayed erase pulse may be used to advantage in realizing a light pen identification function for the plasma display panel.

As noted above, it is desirable to have the delayed erase pulse be scanned over the entire surface of the plasma display panel to permit identification at an arbitrary "on" plasma cell. Accordingly, computer 201 is arranged to provide sets of leads represented by leads 271 and 272 with appropriate scanning addresses for application at respective inputs 230 and 231 to address decoder 240 in FIG. 2. When operated in a normal incrementing code, computer 201 supplies a sequence of addresses at T-second intervals to cause each plasma cell on panel 202 to be addressed in turn.

Also shown in FIG. 2 is light pen 260 and associated amplifier 261. These latter entities are used in standard fashion to detect a light pulse occurring adjacent the tip of light pen 260 to signal the computer that a particular location has emitted a light pulse. Computer 201 is conditioned in standard fashion to detect signals indicating the presence of a light pulse during a portion of the sustain cycle corresponding to the occurrence of the delayed erase pulse. This selective detection is made specific in FIG. 2 by the inclusion of AND gate 262 which gates the light pulse pen input with the delayed erase clock signal appearing at the output of delay unit 252. Light pulses occurring at discharges resulting from the normal sustain operation of the plasma panel and light pulses resulting from normal erase (or write) operations are ignored by computer 201.

It is useful to consider now a possible range for the parameter $\tau$ in FIG. 1D or the related parameter $\Delta$ the amount of delay introduced by delay circuit 252 in FIG. 2. It is common in prior art systems to position the normal erase pulse approximately midway between $t_2$ of a given cycle and $t_0$ of the following cycle. This positioning is sufficient to initiate the erase discharge and cause the previously accumulated charge to redistribute, thereby resulting in a net charge of zero.

To effect the "nondestructive" discharge, i.e., the light pulse at $t_p$ without causing an erase, it has been found that a fairly broad range of values for the erase parameters may be used with good success. In particular, if the erase pulse amplitude is maintained at the same magnitude as a normal sustain pulse, and the width of the erase pulse is unchanged from the 0.5 to 1.5 $\mu$sec value commonly found in systems of the type described in the Johnson et al paper, supra, a value of $\tau = 0-1.0$ $\mu$sec will provide satisfactory operation. Thus assuming $T = 20$ $\mu$sec, $t_2 - t_0 = 10$ $\mu$sec, $t_e - t_0 = 14.5$ $\mu$sec and an erase pulse width of 1.0 $\mu$sec, a typical value for the delay to be introduced by delay unit 252 in FIG. 2 is 4.0 $\mu$sec.

Of course, these typical values for the amplitude, width and position in the sustain cycle will vary in accordance with gas mixture, cell geometry, sustain cycle period and other operating voltages and pulse characteristics. The vaues given, however, are typical of those to be used with systems of the type described in the Johnson et al paper, supra. With deviations from the system parameters found in the many known plasma panel configurations, the value for $\tau$ (and therefore the required delay $\Delta$) may vary over a considerably larger range.

A principal reason for variations in the permissible range for $\tau$ is, of course, the variations in rate at which the plasma cell achieves the equilibrium state associated with a zero. While this has been described above in terms of the decrease in wall voltage or the voltage retained by the cell capacitance, it will be understood that the rate of deionization of the gas in the cell is also a significant factor in determining the reaction of the cell to an erase pulse. Although it is not fully understood, the combined effect of these cell parameters (and they may not all be independent) may be exploited as described above. The central operative phenomenon is that of arresting an erase operation before it can be completed, thereby permitting a cell to be selectively interrogated without destroying stored information while generating a distinguishable (in time) light pulse.

While a particular circuit arrangement has been shown in FIG. 2 for accompanying the selection of particular cells in a plasma panel, and particular circuitry has been shown for generating a normal and a delayed erase pulse, no such circuitry limitations necessarily apply to the invention in its broader aspects. That is, it is well known in the art to provide for the selection of matrix points using a variety of particular circuit arrangements. Likewise, the erase pulses may be generated using circuitry which varies in detail from that indicated in FIG. 2 and discussed above and in the reference cited. The modifications required in accordance with the present invention merely relate to the generation of an erase pulse at a time occurring sufficiently close to a succeeding sustain pulse that the complete (or nearly complete) discharge of the previously stored cell charge does not occur. Applicant has found it particularly convenient to retain all of the operational circuitry occurring in prioir art plasma panels. All that has been required is to selectively delay the generation of an erase pulse so that it occurs at the desired opportune time.

Scanned addressing is accomplished in a standard fashion, using signals generated by computer 201. It should also be clear, however, that alternate means for generating the required sequences of addresses may be used. In particular, separate X and Y counters may have their outputs applied to the inputs 230 and 231, respectively, in FIG. 2. These counters may then be activated and advanced in standard fashion under the control of master clock 235 to generate a new address during each sustain cycle. These addresses may then be applied to computer 201 or other utilization circuitry when a light pen output occurs during the selected scan pulse interval. While not shown, it will occur to those skilled in the art to adjust delay and other time interval to compensate for propagation delays encountered when computer 201 or other utilization is physically removed from the immediate vicinity of the display system 200.

Figures 3A, 3B:
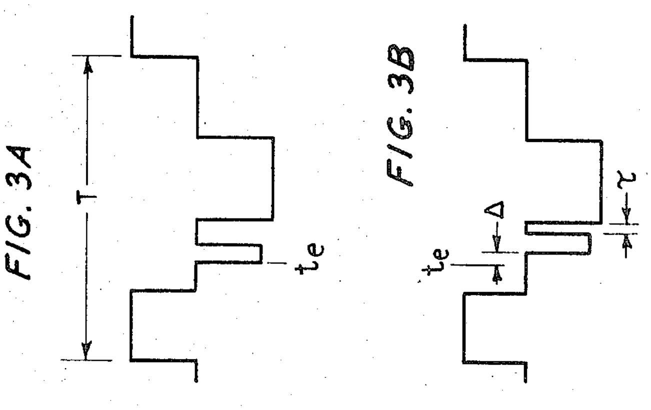
FIGS. 3A, B show variations of the pulse patterns appearing in FIGS. 1A, D, respectively.

Different particular sustain sequences are known in the art. For example, the pulse sequence shown in FIG. 3A is common in the art. The erase pulse shown occurring at $t_e$ is, of course, only present when an erase operation is to take place. FIG. 3B shows how the erase pulse may be selectively delayed (in a scanning manner) in accordance with the present invention to permit light pen identification. Again a delay of $\Delta$ seconds causes the otherwise normal erase pulse to approach the succeeding sustain pulse to within $\tau$ seconds. The same type of relative spacing may be used to advantage in systems having a variety of normal pulse patterns.

The present disclosure has proceeded on the assumption that each cell is to be an element for scanning purposes, i.e., each plasma or other cell is scanned separately in sequence. No such limitation is fundamental to the present invention, however. Thus entire rows, columns, quadrants or any other segment of a display surface may be considered as a scanning element using straightforward modifications to the circuitry disclosed. If sufficient program or other logical control can be resorted to, a more efficient scanning involving successively smaller areas can be used. Thus, for example, search procedures of the type described in U.S. Pat. No. 3,651,508 issued Mar. 21, 1972 may be used. Although the present description has proceeded in terms of the most usual two-state plasma cells, those skilled in the art will recognize the applicability of the present teachings to other than two-state cells, whether plasma cells or other basic light-emitting devices.

Numerous and various other modifications and adaptations of the present invention within the scope of the appended claims will occur to those skilled in the art.

Because the required additional apparatus is small, the present invention permits the realization of an interactive graphics capability at only a modest increase in complexity over simple display systems. Thus, applications of it in videotelephones and similar systems will be particularly attractive.

Although the present disclosure has proceeded primarily in terms of a plasma discharge display panel, it is clear that many of its features are equally applicable to other display systems having inherent memory or self-memory.

What is claimed is:

1. In a display system comprising a plurality of display cells, each cell being capable of remaining in a first state for a period of at least $T_0$ seconds, absent any external factors, means for applying erase signals selectively to said plurality of display cells to restore selected ones of said cells in said first state to a second state before the expiration of said $T_0$-second period of time has elapsed, the effect of said erase signals being operative over a period of duration $T_1 < T_0$ seconds to effect said restoration to said second state, said restoration being accompanied by a characteristic light signal, means for applying sustain signals to sustain those of said plurality of cells which are in said first state for an additional $T_0$-second interval, the improvement comprising:

means for generating delayed replicas of said erase signals, means for sequentially applying said delayed erase signals to those of said plurality of display cells which are in said first state, thereby to give rise to respective characteristic light signals at a time associated with the application of said delayed erase signals, and means for detecting said characteristic light signals resulting from the application of said delayed erase signals.

2. Apparatus according to claim 1 wherein said first state is an "on" state and said means for applying sustain signals comprises means for applying signals sufficient in magnitude to cause those of said display cells which are in said first state to emit light signals during each $T_0$-second interval.

3. Apparatus according to claim 2 wherein said means for delaying comprises means for delaying an erase signal by an amount such that said $T_1$-second period overlaps the application of a subsequent sustain signal, thereby to prevent the effect of said erase signal from becoming complete.

4. Apparatus according to claim 3 wherein said means for sequentially applying said erase signals comprises means for generating sequences of addresses for selecting particular ones of said cells.

5. Apparatus according to claim 4 wherein said system further comprises a light sensitive device responsive to said characteristic light signal for generating an output signal, and means responsive to said output signal and said delayed erase signal for indicating that said light pen is directed at a cell currently having said delayed erase signal applied to it.

6. Apparatus comprising an array of light-emitting devices, each having a stable "off" state and at least one stable "on" state, said devices being maintainable in one of said "on" states by the periodic application of sustain signals, first means for periodically applying sustain signals to said array, second means for generating an erase signal which erase signal, when applied to one or more selected devices in said array, is operative to cause those of said selected devices which were in an "on" state to generate a characteristic light signal, said erase signal also being operative over a finite interval of time, $T_1$, in the absence of any other factors, to restore those of said selected devices which were in an "on" state to said "off" state, third means for causing said erase signal to occur in such time relation with said sustain signals that said $T_1$ period does not occur without the application of said sustain signals, fourth means for selectively applying said erase signal occurring in said time relation with respect to said sustain signals to one or more devices in said array which are in said "on" state, whereby, said devices to which said fourth means applies said erase signal give rise to a characteristic light signal associated with the application of said erase signal but are nevertheless sustained in their pre-existing "on" state.

7. Apparatus according to claim 6 wherein said light-emitting devices each comprise one or more plasma discharge cells.

8. Apparatus according to claim 6 wherein said second means comprises means for generating an erase signal at a time sufficiently removed in time from operative portions of said sustain signals to effectively restore said selected devices to said "off" state, and wherein said third means comprises means for selectively delaying said erase signal.

9. Apparatus according to claim 6 further comprising means for detecting said light signal associated with the application of said erase signal to said one or more selected devices.

10. Apparatus according to claim 6 wherein said fourth means comprises means for sequentially generating signals identifying each of a covering plurality of subsets of devices in said array and means responsive to said identifying signals for sequentially directing said erase signal having said time relation with respect to said sustain signals to respective ones of said subsets of devices.

11. Apparatus according to claim 10 further comprising means for detecting said light signal associated with the application of said erase signal having said time relation with respect to said sustain signals to one or more of said subsets of said devices.

12. Apparatus according to claim 11 further comprising means for associating the detection by said means for detecting of a light signal from a given selected subset of said devices with the signals identifying said given selected subset.

13. Apparatus according to claim 12 wherein said given selected subset comprises a single plasma discharge device and said means for detecting comprises an operator-held light pen, and wherein said means for sequentially generating signals comprises a programmed data processor, whereby said operator is able to indicate a position on said array to said data processor.

14. The machine method of identifying an area on a two dimensional array of plasma discharge display elements comprising A. generating a sequence of address signals corresponding to each of a covering plurality of subsets of said display elements, B. applying periodic sustain signals to said array, C. applying in sequence to at least some of said subsets a pseudo-erase signal which precedes said sustain signals in such close time relation that the restoration of display elements in an "on" condition to an "off" condition cannot proceed to completion before said sustain signals reestablish said "on" condition, and D. detecting the presence a light signal generated by the application of said pseudo-erase signal at a time associated with said application of said pseudo-erase signal to a particular subset of said display elements corresponding to said area.

15. The method according to claim 14 further comprising the step of sending the address signal corresponding to said particular subset to a utilization device upon said detecting of said light signal.

* * * * *